United States Patent
Yan et al.

(10) Patent No.: US 11,255,655 B2
(45) Date of Patent: Feb. 22, 2022

(54) DIFFERENTIAL SINUSOIDAL PHASE MODULATION LASER INTERFEROMETRIC NANOMETER DISPLACEMENT MEASURING APPARATUS AND METHOD

(71) Applicant: ZHEJIANG SCI-TECH UNIVERSITY, Zhejiang (CN)

(72) Inventors: Liping Yan, Zhejiang (CN); Benyong Chen, Zhejiang (CN); Yingtian Lou, Zhejiang (CN); Jiandong Xie, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 0 days.

(21) Appl. No.: 17/256,011

(22) PCT Filed: Sep. 4, 2019

(86) PCT No.: PCT/CN2019/104314
§ 371 (c)(1),
(2) Date: Dec. 24, 2020

(87) PCT Pub. No.: WO2021/017098
PCT Pub. Date: Feb. 4, 2021

(65) Prior Publication Data
US 2021/0199418 A1 Jul. 1, 2021

(30) Foreign Application Priority Data
Jul. 26, 2019 (CN) .......................... 201910681897.1

(51) Int. Cl.
*G01B 9/02* (2006.01)
*G01B 11/14* (2006.01)

(52) U.S. Cl.
CPC ....... *G01B 9/02027* (2013.01); *G01B 9/0207* (2013.01); *G01B 11/14* (2013.01); *G01B 2290/60* (2013.01); *G01B 2290/70* (2013.01)

(58) Field of Classification Search
CPC .. G01B 9/02027; G01B 9/0207; G01B 11/14; G01B 2290/60; G01B 2290/70
See application file for complete search history.

(56) References Cited

U.S. PATENT DOCUMENTS

| | | | | |
|---|---|---|---|---|
| 5,374,991 A | * | 12/1994 | Atkinson | G01F 23/292 356/493 |
| 2010/0027026 A1 | * | 2/2010 | Miyata | G01B 9/0207 356/487 |

(Continued)

FOREIGN PATENT DOCUMENTS

| CN | 102865820 | 1/2013 |
|---|---|---|
| CN | 103075969 | 5/2013 |

(Continued)

OTHER PUBLICATIONS

"International Search Report (Form PCT/ISA/210) of PCT/CN2019/104314", dated Apr. 26, 2020, pp. 1-5.

(Continued)

*Primary Examiner* — Michael A Lyons
(74) *Attorney, Agent, or Firm* — JCIPRNET

(57) ABSTRACT

The disclosure discloses a differential sinusoidal phase modulation laser interferometric nanometer displacement measuring apparatus and method. The beam output from the single-frequency laser is converted into a 45° linearly polarized beam after passing through the polarizer, then projected onto two sets of sinusoidal phase modulation interferometers consisting of the beam splitter, the electro-optic phase modulator, the half wave plate, three pyramid prisms, two polarization beam splitters, thereby forming measurement and reference interference signals which are received by two (Continued)

photodetectors. A high-frequency sinusoidal voltage signal is applied to the electro-optic phase modulator placed in the common reference arm of the two interferometers, thereby modulating the interference signal into a high-frequency AC signal. By detecting the difference between the phase change amounts of the two interference signals when the measured object moves, the measured displacement can be obtained.

5 Claims, 1 Drawing Sheet

(56) References Cited

U.S. PATENT DOCUMENTS

| | | | | |
|---|---|---|---|---|
| 2012/0044500 | A1* | 2/2012 | Kuramoto | G01B 9/02027 356/498 |
| 2018/0328710 | A1* | 11/2018 | Yan | G01B 9/02 |
| 2019/0368860 | A1* | 12/2019 | Yan | H04L 27/233 |

FOREIGN PATENT DOCUMENTS

| | | |
|---|---|---|
| CN | 104880244 | 9/2015 |
| CN | 106017333 | 10/2016 |
| CN | 106705858 | 5/2017 |
| JP | H07110206 | 4/1995 |

OTHER PUBLICATIONS

A. Dandridge et al., "Homodyne demodulation scheme for fiber optic sensors using phase generated carrier", IEEE Transactions on Microwave Theory and Techniques, vol. 30, Issue 10, Oct. 1982, pp. 1635-1641.

Timothy R. Christian et al., "Real-time analog and digital demodulator for interferometric fiber optic sensors", Smart Structures and Materials 1994: Smart Sensing, Processing, and Instrumentation, May 1994, pp. 324-336.

Shihua Zhang et al., "Real-time phase delay compensation of PGC demodulation in sinusoidal phase-modulation interferometer for nanometer displacement measurement", Optics Express, vol. 25, Issue 1, Jan. 2017, pp. 472-485.

* cited by examiner

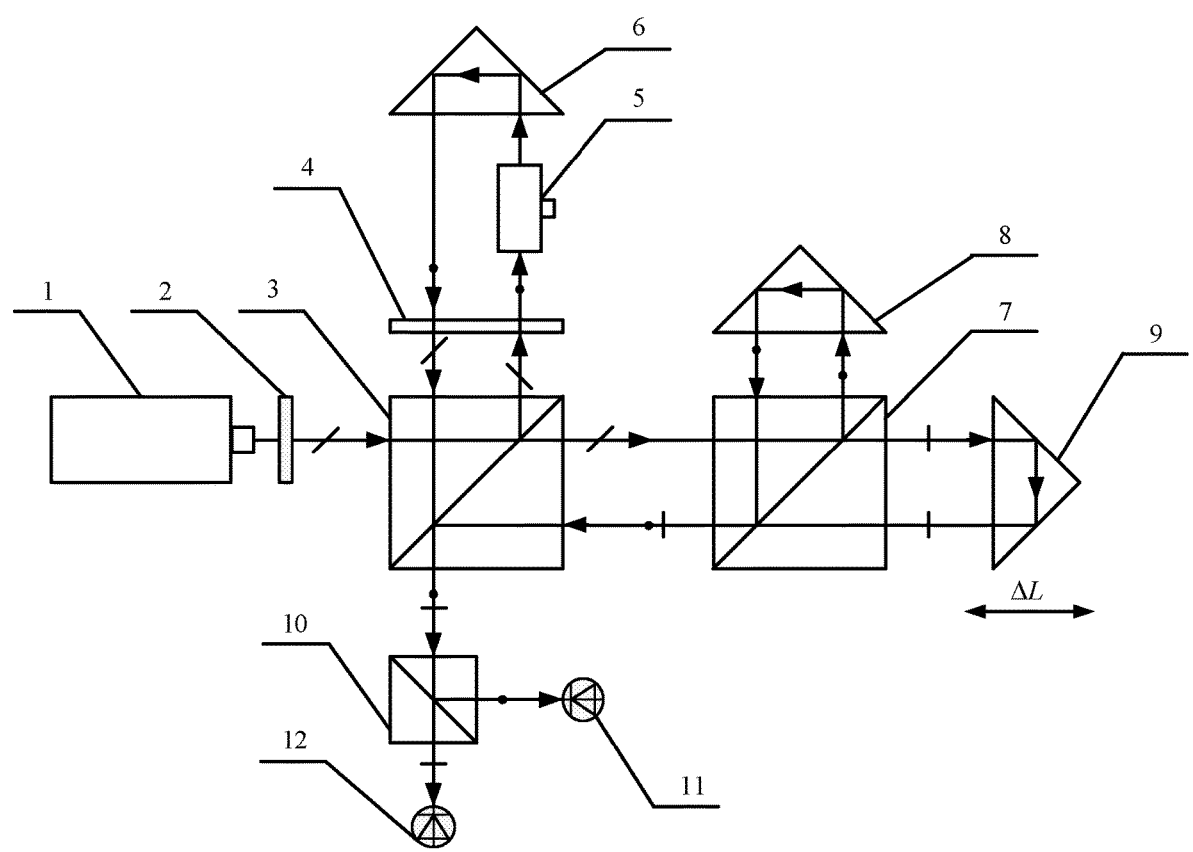

DIFFERENTIAL SINUSOIDAL PHASE MODULATION LASER INTERFEROMETRIC NANOMETER DISPLACEMENT MEASURING APPARATUS AND METHOD

CROSS-REFERENCE TO RELATED APPLICATION

This application is a 371 of international application of PCT application serial no. PCT/CN2019/104314, filed on Sep. 4, 2019, which claims the priority benefit of China application no. 201910681897.1, filed on Jul. 26, 2019. The entirety of each of the above mentioned patent applications is hereby incorporated by reference herein and made a part of this specification.

BACKGROUND

Field of the Disclosure

The disclosure relates to a laser interferometric displacement measuring method and apparatus, in particular to a differential sinusoidal phase modulation laser interferometric nanometer displacement measuring apparatus and method, belonging to the technical field of precision measurement.

Description of Related Art

High-precision nanometer displacement measurement is of great importance in the application of technical fields such as ultra-precision machining, micro-electronics manufacturing, and precise test and measurement. Laser interferometry measurement is widely applied in high-end manufacturing, precise measurement, big science research and other fields because of its large measurement range, high measurement accuracy and direct traceability to the laser wavelength. Based on the difference between the interference signal processing methods, they are mainly categorized into single frequency interferometry, heterodyne interferometry and sinusoidal phase modulation interferometry. Single frequency interferometry by nature detects the DC light intensity. The DC light intensity drift, direct subdivision of interference fringes and non-quadrature interference signal will result in larger error. Heterodyne interferometry is an AC detection, which can overcome the influence of DC light intensity drift. But, due to the first-order nonlinearity errors caused by frequency mixing and polarization mixing, the improvement of measurement accuracy is limited. Sinusoidal phase modulation interferometry modulates the DC interference signal of single frequency interferometer into a high-frequency sinusoidal carrier and its harmonic signal sidebands, which can improve the anti-interference ability of the interference signal. However, it is difficult to improve the accuracy of displacement measurement due to temperature changes and environmental fluctuations of the reference arm and the measurement arm of the interferometer during the measurement process.

SUMMARY OF THE DISCLOSURE

In view of the deficiencies in the related art, the purpose of the disclosure is to provide a differential sinusoidal phase modulation laser interferometric nanometer displacement measuring apparatus and method. Two sets of sinusoidal phase modulation interferometers are constructed simultaneously, an electro-optic phase modulator is placed in the common reference arms of the two interferometers, and the DC interference signals of the two interferometers are modulated into high-frequency sinusoidal carrier AC signals. The difference between the phase change amounts of the two interference signals is demodulated and calculated to obtain the measured displacement, thereby realizing sub-nanometer displacement measurement.

The technical solution adopted by the disclosure for solving its technical problem is:

1. A differential sinusoidal phase modulation laser interferometric nanometer displacement measuring apparatus:

The apparatus includes a single-frequency laser, a polarizer, a beam splitter, a half wave plate, an electro-optic phase modulator, a first pyramid prism, a first polarization beam splitter, a second pyramid prism, a third pyramid prism, a second polarization beam splitter, a first photodetector and a second photodetector. The beam emitted from the single-frequency laser is converted into a linearly polarized beam with 45° polarization direction with respect to beam propagation direction after passing through the polarizer. Then, this 45° linearly polarized beam is incident on the beam splitter and divided into transmitted beam and reflected beam. The reflected beam from the beam splitter is modulated into s-polarized beam after passing through the half wave plate, which is then modulated by the electro-optic phase modulator and then projected onto the first pyramid prism. The reflected beam from the first pyramid prism passes through the half wave plate again and then becomes 45° linearly polarized beam and is incident on the beam splitter for transmission. The transmitted beam from the beam splitter is incident on the first polarization beam splitter for reflection and transmission, and respectively divided into two orthogonal linearly polarized beams in s-polarization and p-polarization. The s-polarized beam reflected by the first polarization beam splitter is projected onto the second pyramid prism. The p-polarized beam transmitted by the first polarization beam splitter is projected onto the third pyramid prism. The s-polarized beam reflected by the second pyramid prism and the p-polarized beam reflected by the third pyramid prism return to the first polarization beam splitter and are combined into an orthogonal linearly polarized beam and then incident to the beam splitter for reflection. The 45° linearly polarized beam passed through the half wave plate and the orthogonal linearly polarized beam returned from the first polarization beam splitter are merged at the beam splitter. Specifically, interference is generated between the s-polarized component of the 45° linearly polarized beam and the s-polarized component of the orthogonal linearly polarized beam to form an s-polarized interference signal; and interference is generated between the p-polarized component of the 45° linearly polarized beam and the p-polarized beam of the orthogonal linearly polarized beam to form a p-polarized interference signal. The s-polarized interference signal serves as a reference interference signal and is received by the first photodetector after being reflected by the second polarization beam splitter. The p-polarized interference signal serves as a measurement interference signal and is received by the second photodetector after being transmitted by the second polarization beam splitter.

The polarization transmission direction of the polarizer is 45° to the beam propagation direction.

The optical axis of the half wave plate is 22.5° to the beam propagation direction.

The electro-optic phase modulator is placed between the half wave plate and the first pyramid prism, and modulates the s-polarized beam output from the half wave plate and transmitted to the first pyramid prism. The electric field of the electro-optic phase modulator is applied along with the polarization direction of s-polarized beam.

2. A differential sinusoidal phase modulation laser interferometric nanometer displacement measuring method:

1) The beam with a wavelength of λ emitted from the single-frequency laser is converted by the polarizer into linearly polarized beam with 45° polarization direction with respect to beam propagation direction after passing through the polarizer, and this 45° linearly polarized beam is respectively projected onto the reference sinusoidal phase modulation interferometer consisting of the beam splitter, the half wave plate, the electro-optic phase modulator, the first pyramid prism, the first polarization beam splitter and the second pyramid prism as well as the measurement sinusoidal phase modulation interferometer consisting of the same beam splitter, the half wave plate, the electro-optic phase modulator, the first pyramid prism, the first polarization beam splitter and a different third pyramid prism, thereby forming the reference interference signal and the measurement interference signal respectively, and then are received by two photodetectors (11, 12) after being split by the second polarization beam splitter.

2) The electro-optic phase modulator is placed between the half wave plate and the first pyramid prism of the sinusoidal phase modulation interferometer, and modulates the s-polarized beam emitted from the half wave plate and incident into the first pyramid prism. A high-frequency sinusoidal carrier voltage with electric field direction is consistent with the polarization direction of the s-polarized beam is applied to the electro-optic phase modulator, thereby modulating the interference signals of the reference sinusoidal phase modulation interferometer and the measurement sinusoidal phase modulation interferometer into high-frequency sinusoidal carrier AC interference signals.

3) The third pyramid prism is fixed on the object to be measured. When the third pyramid prism is moved a displacement ΔL, the PGC phase demodulation method is adopted to obtain the phase change amount $\Delta\varphi_R$ of the reference interference signal and the phase change amount $\Delta\varphi_M$ of the measurement interference signal, which are respectively as follows:

$$\Delta\varphi_R = \frac{2\pi \cdot (\delta L_M - \delta L_R)}{\lambda}$$

$$\Delta\varphi_M = \frac{2\pi \cdot (2 \cdot \Delta L + \delta L_M - \delta L_R)}{\lambda}$$

In the above formula, λ is the laser wavelength, $\delta L_R$ is the fluctuation of the optical path length between the beam splitter and the first pyramid prism caused by temperature drift and environmental disturbance during the movement of the third pyramid prism, and $\delta L_M$ is the fluctuation of the optical path length between the beam splitter and the first polarization beam splitter caused by temperature drift and environmental disturbance during the movement of the third pyramid prism.

4) By calculating the difference between the phase change amount of the measurement interference signal and the phase change amount of the reference interference signal, the measured displacement ΔL is obtained by using the following formula:

$$\Delta L = \frac{(\Delta\varphi_M - \Delta\varphi_R)}{2\pi} \times \frac{\lambda}{2}$$

Thus, the movement displacement of the third pyramid prism is obtained.

The advantageous effects of the disclosure are:

(1) The disclosure includes two sets of sinusoidal phase modulation interferometers. By applying a high-frequency sinusoidal modulation voltage to the electro-optic phase modulator in the common reference arms of the two interferometers, the DC interference signals of the two interferometers are modulated into high-frequency sinusoidal carrier AC interference signals, thereby improving the anti-interference ability of interference signal.

(2) When the third pyramid prism is moving, the phase change amount of the measurement interference signal and the phase change amount of the reference interference signal are detected, and the difference between the phase change amounts of the two interference signals of the two interferometers is calculated to obtain the measured displacement. The error caused by temperature drift and environmental disturbance is eliminated, so the measurement result can achieve an accuracy up to sub-nanometer level and is about 88 pm.

(3) The optical path structure is simple and easy to use. The disclosure is mainly suitable for displacement measurement at sub-nanometer precision level involved in the fields of ultra-precision machining, micro-electronics manufacturing, and precise test and measurement.

BRIEF DESCRIPTION OF THE DRAWINGS

FIG. 1 is a schematic diagram of the apparatus and method of the disclosure.

In FIGURE: 1. Single-frequency laser, 2. Polarizer, 3. Beam splitter, 4. Half wave plate, 5. Electro-optic phase modulator, 6. First pyramid prism, 7. First polarization beam splitter, 8. Second pyramid prism, 9. Third pyramid prism, 10. Second polarization beam splitter, 11. First photodetector, 12. Second photodetector.

DESCRIPTION OF EMBODIMENTS

The disclosure will be further described in details hereinafter with the Figures and Embodiments.

As shown in FIG. 1, the disclosure includes a single-frequency laser 1, a polarizer 2, a beam splitter 3, a half wave plate 4, an electro-optic phase modulator 5, a first pyramid prism 6, a first polarization beam splitter 7, a second pyramid prism 8, a third pyramid prism 9, a second polarization beam splitter 10, a first photodetector 11 and a second photodetector 12. The beam emitted from the single-frequency laser 1 is converted into a linearly polarized beam with 45° polarization direction with respect to beam propagation direction after passing through the polarizer 2. Then, this 45° linearly polarized beam is incident on the beam splitter 3 and divided into transmitted beam and reflected beam. The reflected output beam from the beam splitter 3 is modulated into s-polarized beam after passing through the half wave plate 4, which is then modulated by the electro-optic phase modulator 5 and then projected onto the first pyramid prism 6. The reflected beam from the first pyramid prism 6 passes through the half wave plate 4 again and then becomes 45° linearly polarized beam and is incident on the beam splitter 3 for transmission. The transmitted beam from the beam splitter 3 is incident on the first polarization beam splitter 7 for reflection and transmission, and respectively divided into two orthogonal linearly polarized beams in s-polarization and p-polarization. The s-polarized beam reflected by the first polarization beam splitter 7 is projected onto the second pyramid prism 8. The p-polarized beam transmitted by the first polarization beam splitter is projected onto the third pyramid prism 9. The s-polarized beam reflected by the second pyramid prism 8 and the p-polarized beam reflected by the third pyramid prism 9 return to the first polarization beam splitter 7 and are combined into an orthogonal linearly polarized beam and then incident to the beam splitter 3 for reflection. The 45° linearly polarized beam passed through the half wave plate 4 and the orthogonal linearly polarized beam returned from the first polarization beam splitter 7 are merged at the beam splitter 3. Specifically, interference is generated between the s-polarized component of the 45° linearly polarized beam and the s-polarized component of the orthogonal linearly polarized beam to form an s-polarized interference signal; and interference is generated between the p-polarized component of the 45° linearly polarized beam and the p-polarized beam of the orthogonal linearly polarized beam to form a p-polarized interference signal. The s-polarized interference signal serves as a reference interference signal and is received by the first photodetector 11 after being reflected by the second polarization beam splitter 10. The p-polarized interference signal serves as a measurement interference signal and is received by the second photodetector 12 after being transmitted by the second polarization beam splitter 10.

Denoting the interferometer composed of the beam splitter 3, the half wave plate 4, the electro-optic phase modulator 5, the first pyramid prism 6, the first polarization beam splitter 7 and the second pyramid prism 8 as the reference sinusoidal phase modulation interferometer, denoting the interferometer composed of the beam splitter 3, the half wave plate 4, the electro-optic phase modulator 5, the first pyramid prism 6, the first polarization beam splitter 7 and the third pyramid prism 9 as the measurement sinusoidal phase modulation interferometer, as can be seen from FIG. 1, the optical path between the beam splitter 3 and the first pyramid prism 6 constitutes the common reference arm of the reference interferometer and the measurement interferometer; the optical path between the beam splitter 3, the first polarization beam splitter 7 and the second pyramid prism 8 constitutes the measurement arm of the reference interferometer; and the optical path between the beam splitter 3, the first polarization beam splitter 7 and the third pyramid prism 9 constitutes the measurement arm of the measurement interferometer.

Two sets of interferometers are formed as described above. The electro-optic phase modulator 5 is used to modulate the DC interference signal of the interferometer into a high-frequency sinusoidal carrier AC signal. When the third pyramid prism 9 fixed on the object to be measured moves, it makes the phase of the measurement interferometer to change, by detecting the phase change amounts of the two interferometers, the displacement can be calculated and obtained more accurately.

The polarization transmission direction of the polarizer 2 is 45° to the beam propagation direction, and the optical axis of the half wave plate 4 is 22.5° to the beam propagation direction.

The electro-optic phase modulator 5 is placed between the half wave plate 4 and the first pyramid prism 6, and modulates the s-polarized beam output from the half wave plate 4 and transmitted to the first pyramid prism 6. The electric field of the electro-optic phase modulator 5 is applied along with the polarization direction of s-polarized beam.

The implementation process of the disclosure is as follows:

Denoting the interferometer composed of the beam splitter 3, the half wave plate 4, the electro-optic phase modulator 5, the first pyramid prism 6, the first polarization beam splitter 7 and the second pyramid prism 8 as the reference sinusoidal phase modulation interferometer, denoting the interferometer composed of the beam splitter 3, the half wave plate 4, the electro-optic phase modulator 5, the first pyramid prism 6, the first polarization beam splitter 7 and the third pyramid prism 9 as the measurement sinusoidal phase modulation interferometer, as can be seen from FIG. 1, the optical path between the beam splitter 3 and the first pyramid prism 6 constitutes the common reference arm of the reference interferometer and the measurement interferometer; the optical path between the beam splitter 3, the first polarization beam splitter 7 and the second pyramid prism 8 constitutes the measurement arm of the reference interferometer; and the optical path between the beam splitter 3, the first polarization beam splitter 7 and the third pyramid prism 9 constitutes the measurement arm of the measurement interferometer.

At the beginning of the measurement, denoting $L_{CR}$ as the common reference arm optical path length of the reference interferometer and the measurement interferometer, denoting $L_{M1}$ as the measurement arm optical path length of the reference interferometer, and denoting $L_{M2}$ as the measurement arm optical path length of the measurement interferometer. When the electro-optic phase modulator 5 is applied a high-frequency sinusoidal voltage, the reference and measurement interference signals received by the two detectors are:

$$S_1(t) = S_{01} + S_{11}\cos\left(z\cos\omega t + 2\pi \cdot \frac{L_{M1} - L_{CR}}{\lambda}\right) \quad (1)$$

$$S_2(t) = S_{02} + S_{12}\cos\left(z\cos\omega t + 2\pi \cdot \frac{L_{M2} - L_{CR}}{\lambda}\right) \quad (2)$$

In the formula, $S_{01}$ and $S_{11}$ respectively represent the DC component and AC component amplitude of the reference interference signal, $S_{02}$ and $S_{12}$ respectively represent the DC component and AC component amplitude of the measurement interference signal, $\lambda$ is the laser wavelength, $\omega$ is the frequency of the sinusoidal voltage applied to the electro-optic phase modulator 5, and z is the sinusoidal phase modulation depth.

It can be seen from formulas (1) and (2) that the reference interference signal and the measurement interference signal are modulated into high-frequency sinusoidal carrier AC signals, and the phase $\varphi_R$ of the reference interference signal and the phase $\varphi_M$ of the measurement interference signal are obtained by using the PGC phase demodulation method, which are respectively as follows:

$$\varphi_R = \frac{2\pi(L_{M1} - L_{CR})}{\lambda} \quad (3)$$

$$\varphi_M = \frac{2\pi(L_{M2} - L_{CR})}{\lambda} \quad (4)$$

The third pyramid prism 9 is moved a displacement $\Delta L$. In this process, being affected by temperature drift and environmental disturbance, the optical path length of the common reference arm and measurement arms of the two interferometers will change. Denoting the optical path length fluctuation from the beam splitter 3 to the first pyramid prism 6 as $\delta L_R$, denoting the optical path length fluctuation from the beam splitter 3 to the first polarization splitter 7 as $\delta L_M$, then the phases of the reference interference signal and the measurement interference signal become as follows:

$$\varphi'_R = \frac{2\pi(L_{M1} - L_{CR} + \delta L_M - \delta L_R)}{\lambda} \quad (5)$$

$$\varphi'_M = \frac{2\pi(L_{M2} + 2\Delta L - L_{CR} + \delta L_M - \delta L_R)}{\lambda} \quad (6)$$

And the phase change amounts of the two interference signals are:

$$\Delta\varphi_R = \varphi'_R - \varphi_R = \frac{2\pi \cdot (\delta L_M - \delta L_R)}{\lambda} \quad (7)$$

$$\Delta\varphi_M = \varphi'_M - \varphi_R = \frac{2\pi \cdot (2 \cdot \Delta L + \delta L_M - \delta L_R)}{\lambda} \quad (8)$$

In the formula, $\Delta\varphi_R$ represents the phase change amount of the reference interference signal, and $\Delta\varphi_M$ represents the phase change amount of the measurement interference signal.

According to formulas (7) and (8), the moving displacement $\Delta L$ of the third pyramid prism 9 is obtained by:

$$\Delta L = \frac{(\Delta\varphi_M - \Delta\varphi_R)}{2\pi} \times \frac{\lambda}{2} \quad (9)$$

In the embodiment of the present invention, the laser source is the single frequency He—Ne stabilized laser with the model of XL80 made by Renishaw Company from England. The output linearly polarized beam wavelength $\lambda$=632.990577 nm. The modulation frequency of the electro-optic phase modulator is 1 MHz. The bandwidth of the photodetector is 10 MHz. The PGC phase demodulation technology can generally achieve a phase demodulation accuracy of 0.1° at current art. Thereby, by substituting these typical values into formula (9), the displacement measurement accuracy can be up to 88 pm.

From the above description, in the present invention, two sets of sinusoidal phase modulation interferometers are constructed. By placing an electro-optic phase modulator in the common reference arm of the two interferometers, the DC interference signals of the two interferometers are modulated into high-frequency sinusoidal carrier AC signals, thereby improving the anti-interference ability of the interference signal. The phase change of the reference interferometer characterizes the optical path length fluctuation of the reference arm and part of the measurement arm of the interferometer caused by temperature drift and environmental disturbance during the measurement process. By calculating the difference between the phase change amounts of the two interference signals, the measured displacement can be obtained, and the error caused by temperature drift and environmental disturbance can be eliminated, thereby realizing sub-nanometer displacement measurement accuracy.

The above-mentioned specific embodiments are used to explain the present disclosure, not to limit the present disclosure. Any modification or change made to the present disclosure within the spirit of the present disclosure and the protection scope of the claims shall fall into the protection scope of the present disclosure.

What is claimed is:

1. A differential sinusoidal phase modulation laser interferometric nanometer displacement measuring apparatus, comprising:

a single-frequency laser, a polarizer, a beam splitter, a half wave plate, an electro-optic phase modulator, a first pyramid prism, a first polarization beam splitter, a second pyramid prism, a third pyramid prism, a second polarization beam splitter, a first photodetector and a second photodetector;

wherein a beam emitted from the single-frequency laser is converted into a linearly polarized beam with a 45° polarization direction with respect to a beam propagation direction after passing through the polarizer and then the linearly polarized beam with the 45° polarization direction is incident on the beam splitter and divided into a transmitted beam and a reflected beam;

the reflected beam from the beam splitter is modulated into a s-polarized beam after passing through the half wave plate, which is then modulated by the electro-optic phase modulator and then projected onto the first pyramid prism, the reflected beam from the first pyramid prism passes through the half wave plate again and then becomes a 45° linearly polarized beam and is incident on the beam splitter for transmission;

the transmitted beam from the beam splitter is incident on the first polarization beam splitter for reflection and transmission, and respectively divided into two orthogonal linearly polarized beams in s-polarization and p-polarization, the s-polarized beam reflected by the first polarization beam splitter is projected onto the second pyramid prism, the p-polarized beam transmitted by the first polarization beam splitter is projected onto the third pyramid prism, the s-polarized beam reflected by the second pyramid prism and the p-polarized beam reflected by the third pyramid prism return to the first polarization beam splitter and are combined into an orthogonal linearly polarized beam and then incident to the beam splitter for reflection;

the 45° linearly polarized beam passed through the half wave plate and the orthogonal linearly polarized beam returned from the first polarization beam splitter are merged at the beam splitter, wherein, interference is generated between a s-polarized component of the 45° linearly polarized beam and a s-polarized component of the orthogonal linearly polarized beam to form a s-polarized interference signal; and interference is generated between a p-polarized component of the 45° linearly polarized beam and a p-polarized beam of the orthogonal linearly polarized beam to form a p-polarized interference signal, the s-polarized interference signal serves as a reference interference signal and is received by the first photodetector after being reflected by the second polarization beam splitter, the p-polarized interference signal serves as a measurement interference signal and is received by the second photodetector after being transmitted by the second polarization beam splitter.

2. The differential sinusoidal phase modulation laser interferometric nanometer displacement measuring apparatus according to claim 1, wherein a polarization transmission direction of the polarizer is 45° to the beam propagation direction.

3. The differential sinusoidal phase modulation laser interferometric nanometer displacement measuring apparatus according to claim 1, wherein an optical axis of the half wave plate is 22.5° to the beam propagation direction.

4. The differential sinusoidal phase modulation laser interferometric nanometer displacement measuring apparatus according to claim 1, wherein the electro-optic phase modulator is placed between the half wave plate and the first pyramid prism, and modulates the s-polarized beam output from the half wave plate and transmitted to the first pyramid prism, an electric field of the electro-optic phase modulator is applied along with a polarization direction of the s-polarized beam.

5. A differential sinusoidal phase modulation laser interferometric nanometer displacement measuring method, comprising the following steps:
1) outputting a beam with a wavelength of λ emitted from a single-frequency laser, wherein the beam is converted by a polarizer into a linearly polarized beam with a 45° polarization direction with respect to a beam propagation direction after passing through a polarizer, and the linearly polarized beam with the 45° polarization direction is respectively projected onto a reference sinusoidal phase modulation interferometer consisting of a beam splitter, a half wave plate, an electro-optic phase modulator, a first pyramid prism, a first polarization beam splitter and a second pyramid prism sequentially in one light path of the linearly polarized beam with the 45° polarization direction, as well as a measurement sinusoidal phase modulation interferometer consisting of the beam splitter, the half wave plate, the electro-optic phase modulator, the first pyramid prism, the first polarization beam splitter and a third pyramid prism sequentially in the other light path of the linearly polarized beam with the 45° polarization direction, thereby forming a reference interference signal and a measurement interference signal respectively, and then are received by two photodetectors after being split by a second polarization beam splitter;
2) modulating a s-polarized beam emitted from the half wave plate and incident into the first pyramid prism by the electro-optic phase modulator, and applying a high-frequency sinusoidal carrier voltage whose electric field direction is consistent with a polarization direction of the s-polarized beam to the electro-optic phase modulator, thereby modulating the interference signals of the reference sinusoidal phase modulation interferometer and the measurement sinusoidal phase modulation interferometer into high-frequency sinusoidal carrier AC interference signals;
3) when the third pyramid prism is moved a displacement $\Delta L$, adopting a Phase Generated Carrier (PGC) phase demodulation method is adopted to obtain a phase change amount $\Delta \varphi_R$ of the reference interference signal and a phase change amount $\Delta \varphi_M$ of the measurement interference signal, which are respectively as follows:

$$\Delta \varphi_R = \frac{2\pi \cdot (\delta L_M - \delta L_R)}{\lambda}$$

$$\Delta \varphi_M = \frac{2\pi \cdot (2 \cdot \Delta L + \delta L_M - \delta L_R)}{\lambda}$$

in the above formula, $\lambda$ is a laser wavelength, $\delta L_R$ is a fluctuation of an optical path length between the beam splitter and the first pyramid prism caused by a temperature drift and an environmental disturbance during a movement of the third pyramid prism, $\delta L_M$ is a fluctuation of an optical path length between beam splitter and the first polarization beam splitter caused by the temperature drift and the environmental disturbance during the movement of the third pyramid prism;
4) by calculating a difference between the phase change amount of the measurement interference signal and the phase change amount of the reference interference signal, and then by using the following formula:

$$\Delta L = \frac{(\Delta \varphi_M - \Delta \varphi_R)}{2\pi} \times \frac{\lambda}{2}$$

to obtain a measured displacement $\Delta L$, thus, a movement displacement of the third pyramid prism is obtained.

* * * * *